Oct. 28, 1969  R. ODENBERG ETAL  3,475,653
ELECTRICAL CIRCUIT PROTECTOR
Filed Jan. 11, 1965  3 Sheets-Sheet 1

INVENTORS
RICHARD ODENBERG
WILLIAM L. JAMESON
BY Fulwider, Patton, Rieber,
Lee, and Utecht
ATTORNEYS Oct. 28, 1969   R. ODENBERG ETAL   3,475,653
ELECTRICAL CIRCUIT PROTECTOR
Filed Jan. 11, 1965   3 Sheets-Sheet 2
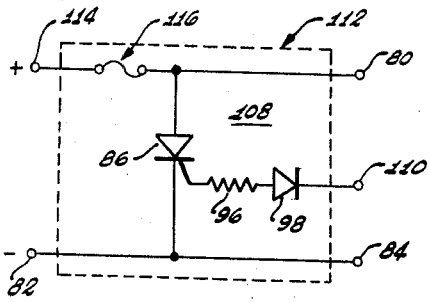
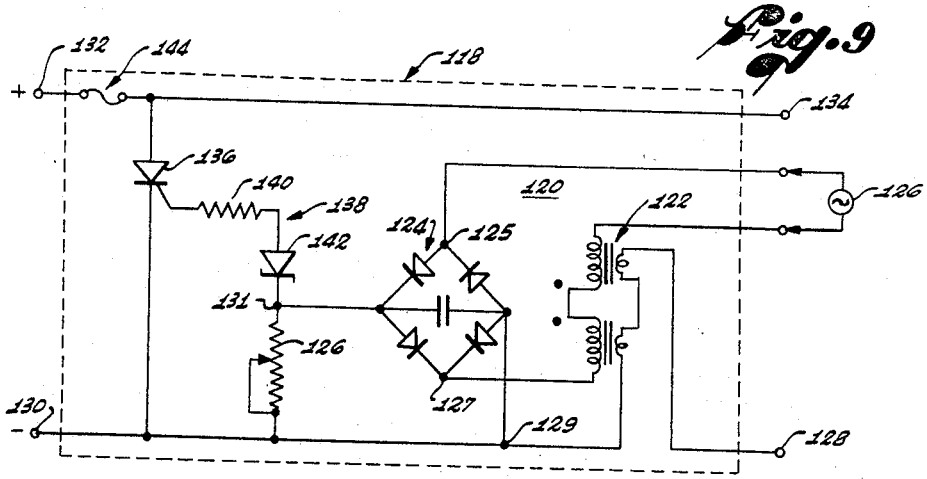
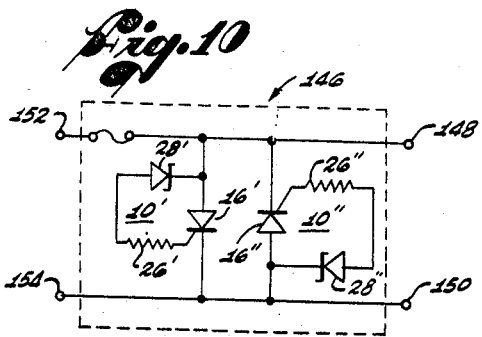
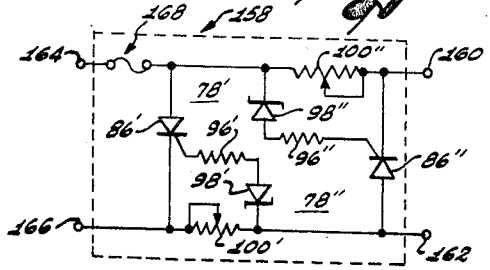
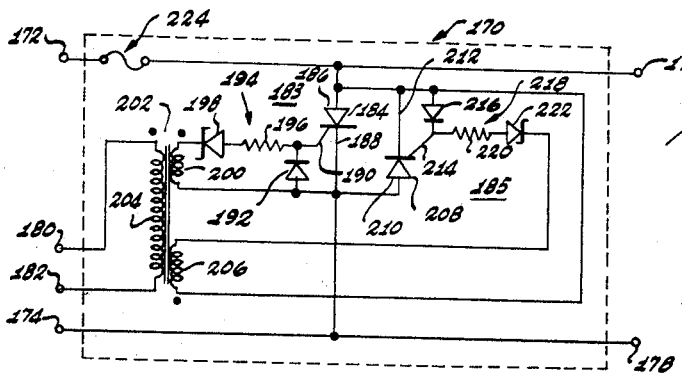
INVENTORS
RICHARD ODENBERG
WILLIAM L. JAMESON
BY Fulwider, Patton, Rieber
Lee, and Utecht
ATTORNEYS

United States Patent Office 3,475,653
Patented Oct. 28, 1969

3,475,653
ELECTRICAL CIRCUIT PROTECTOR
Richard Odenberg, Van Nuys, and William L. Jameson, Granada Hills, Calif., assignors to Research III, Inc., Lawndale, Calif., a corporation of California
Filed Jan. 11, 1965, Ser. No. 424,696
Int. Cl. H02h 3/00, 7/00, 5/00
U.S. Cl. 317—16                                11 Claims

ABSTRACT OF THE DISCLOSURE

An electrical unit for installation as a protection device for electrical circuits which may be subjected to potentially damaging overvoltage and/or overcurrent conditions. The unit includes a normally nonconductive silicon controlled rectifier and a Zener diode and resistance combination in series with the rectifier control electrode, and the unit may also include automatically resetting switch means. Various configurations are provided for D.C. or A.C. systems, as well as for remote sensing.

---

The present invention relates to apparatus for protecting electrical circuits from undesired current and voltage transients and more particularly to a protector for semiconductor circuitry.

It is presently common practice to include some sort of protection device in electrical circuits to prevent high current and voltage transients, commonly called "over currents" and "over-voltages," from overloading, damaging, or destroying the components of the circuits. This is very important in circuitry employing semiconductor devices such as transistors which are especially susceptible to burn-out.

Fuses and electromechanical circuit breakers are the most common circuit protection devices used for such purposes. Unfortunately, fuses and conventional circuit breakers are relatively slow operating devices and do not provide protection against sudden transients of the microsecond variety. Such transients literally go unnoticed by fuses and conventional circuit breakers and therefore wreak great havoc and destruction particularly upon semiconductor circuit elements.

Also, fuses and conventional circuit breakers require replacement and manual resetting after operation. This is annoying and can be very laborious particularly when the circuit is housed in compact or difficult to reach surroundings.

For these reasons, elaborate electrical circuit breakers have been developed. Such circuit breakers, however, are very complex, expensive and not nearly as compact as the fuse or conventional electro-mechanical circuit breaker. Further, the more elaborate circuit breakers still require manual resetting after operation.

In view of the foregoing, it is an object of this invention to provide an improved protection device particularly useful in preventing the overloading and destruction of semiconductor circuitry.

Another object of this invention is to provide a circuit protection device which is simple in design, inexpensive to manufacture and which will operate upon transients of less than one microsecond duration.

A further object of this invention is to provide a circuit protection device of the foregoing type which is extremely compact, rugged and durable in construction and which is long lasting and reliable in operation.

Still another object of this invention is to provide an improved circuit protection device which is automatically resettable.

A still further object of this invention is to provide an automatically resettable circuit protection device which is simple in design and which is capable of operating upon transients of less than one microsecond duration.

The foregoing as well as other objects and advantages of this invention may be more clearly understood by reference to the following detailed description when taken with the drawings which illustrate by way of example only particular forms of the circuit protector of the present invention.

In the drawings:

FIGURE 8 is a schematic of an automatically resettable circuit protector including a remote lead for sensing over-current conditions;

FIGURE 9 is a schematic of an automatically resettable circuit protector including a magnetic amplifier for sensing over-current conditions;

FIGURE 10 is a schematic of an automatically resettable A-C circuit protector for sensing and operating upon over-voltages;

FIGURE 11 is a schematic of an automatically resettable A-C circuit protector for sensing and operating upon over-currents;

FIGURE 12 is a schematic of an automatically resettable A-C circuit protector including a remote lead for sensing over-current conditions;

Figure 1:
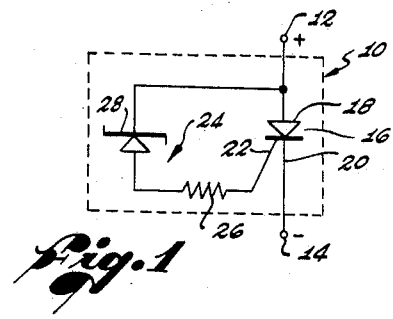
FIGURE 1 is a schematic representation of a basic form of the protector for protecting circuitry against undesired over-voltages.

In FIGURE 1, the circuit protector is represented generally by numeral 10 and includes a pair of terminals 12 and 14 adapted for connection to the positive and negative sides of a direct current source as well as to the input terminals of the circuit being protected. Connected between the terminals 12 and 14 is a silicon controlled rectifier 16 having its anode 18 connected to the terminal 12 and its cathode 20 connected to the terminal 14. The silicon controlled rectifier 16 also includes a control or gate electrode 22 connected to a series electrical circuit 24 including a resistor 26 and a Zener diode 28—the anode of the Zener diode being connected to the resistor and the cathode to the terminal 12.

The operation of a silicon controlled rectifier is fairly well understood. By way of brief summary, however, the silicon controlled rectifier can be switched to its conductive state by a small value of current flowing from the control electrode to the cathode. In fact, the presence of a relatively low voltage signal at the control electrode, commonly called the gate voltage, will cause the rectifier to become conductive whenever a positive voltage is present at its anode. Once started, the current will continue to flow as long as the positive anode voltage is available even though the control electrode current is removed subsequent to the actuation of the rectifier. Under these circumstances, the operation of the silicon controlled rectifier is analogous to a self-holding relay and the loss of control by the control electrode once the rectifier is conductive is analogous to the loss of control of the grid of the thyratron.

In the protector circuit 10, the minimum line voltage at which the silicon controlled rectifier 16 becomes conductive, hereinafter referred to as the triggering line voltage, is controlled by the threshold voltage of the Zener diode 28 and the voltage drop across the resistor 26. In fact, the triggering line voltage is equal to the threshold voltage of the Zener diode, the voltage drop across the resistor 26 and the gate voltage for the silicon controlled rectifier, the voltage drop across the resistor 26 being equal to the resistance value of the resistor times the current required to develop the gate voltage. Thus by careful selection of the Zener diode 28 and by calibration of the value of the resistor 26, the triggering line voltage may be very accurately preset.

Assuming that the anode 18 of the silicon controlled rectifier 16 is positive relative to the cathode 20, the protector 10 will only operate when voltage above the predetermined triggering line voltage appears across the terminals 12 and 14. When this occurs, the threshold voltage of the Zener diode 28 is exceeded, causing the Zener diode to rapidly switch to a conductive state. Current then flows through the Zener diode, the resistors 26, and through the control electrode-cathode circuit of the silicon controlled rectifier, causing the silicon controlled rectifier to switch to its conductive state. In this condition, the silicon controlled rectifier appears as a short circuit across the circuit being protected. Substantially all current then flows through the anode-cathode circuit of the silicon controlled rectifier to prevent the over-voltage from damaging the protected circuitry.

The silicon controlled rectifier 16 will remain in its conductive state to short circuit the protected circuitry until the positive potential is removed from the anode 18. In the protector 10, this requires the manual opening of source connection to the protector. In the circuit protector 30 illustrated in FIGURE 3, however, such resetting of the silicon controlled rectifier is automatic.

The circuit protector 30 is very similar to the basic over-voltage protector illustrated in FIGURE 1. In fact, the protector 30 includes therein the protector 10 with the terminal 12 functioning as an output terminal for connection, with the terminal 14, to the circuitry being protected. In addition to the basic protector 10, the circuit protector 30 also includes an input terminal 32 for connection to the positive terminal of a D-C source and an electrical switch means 34, connected between the input terminal 32 and the anode of the silicon controlled rectifier 16 in series with the output terminal 12. The switch means 34 has the characteristic of being normally closed yet will open in response to the short circuit current flow through the conductive silicon controlled rectifier 14. In addition, the switch means 34 possesses the capability of automatically resetting or re-closing a predetermined time after opening. One typical example of such a switch means is a thermal breaker of the bimetal strip type.

The operation of the circuit protector 30 is very similar to the previously described operation of the protector 10. In particular, when an over-voltage appears between the terminals 32 and 14 exceeding the triggering line voltage, the Zener diode 28 switches to a conductive state and current flows through the resistor 26, causing the silicon controlled rectifier 16 to switch to its conductive state.

The silicon controlled rectifier 16 then effectively short circuits the protected circuitry and substantially all current from the D-C source flows through the silicon controlled rectifier 16 and the switch means 34. The switch means 34 is selected such that the short circuit current flow through the silicon controlled rectifier 16 causes the switch means to open. For example, when a thermal breaker is utilized as a switch means 34, the short circuit current flow through the silicon controlled rectifier 16 causes the thermal breaker to heat up and the bimetallic strips thereof to separate, opening the switch means. After a predetermined period of time, the switch means recloses—as by the cooling and reclosing of the bimetal strips of a thermal breaker.

When the switch means 34 opens, two functions occur. First, of course, the circuit between the D-C source to the protected circuitry is opened. Second, and more important, the voltage at the anode of the silicon controlled rectifier 16 drops, causing the silicon controlled rectifier to return to its nonconductive state. Thus, when the switch means 34 recloses, the silicon controlled rectifier 16 and the circuit protector 30 are again ready for operation upon the occurrence of an undesired over-voltage. If the over-voltage which caused the original operation of the circuit protector 30 is still present, the foregoing operation is repeated and will continue to repeat until the over-voltage condition subsides or is corrected.

In practice, the response or firing time of the protectors 10 and 30 has proven to be extremely short—less than 500 nano-seconds. Thus, both the basic and the automatically resettable D-C over-voltage protectors are capable of operating upon high voltage transients of well less than one microsecond.

Further, because of their simplicity, the protectors 10 and 30 are small in size and weight and extremely rugged and compact in construction.

Also, both the basic and the resettable protectors have proven themselves highly reliable and to possess an operating life well in excess of one million cycles over temperature ranges of between −50° C. to above 100° C.

Moreover, the protector 30 is automatically resettable. This does away with the requirement of manual resetting which as previously indicated can be both annoying as well as laborious particularly when the protected circuitry is in a remote or difficult to service surrounding.

Figure 13:
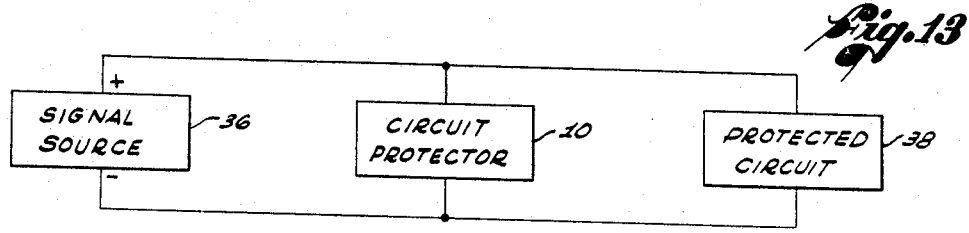
FIGURE 13 is a block diagram of an electrical circuit illustrating the circuit connection of the basic form of over-voltage circuit protector in combination with signal source and a protected circuit.
Figure 15:
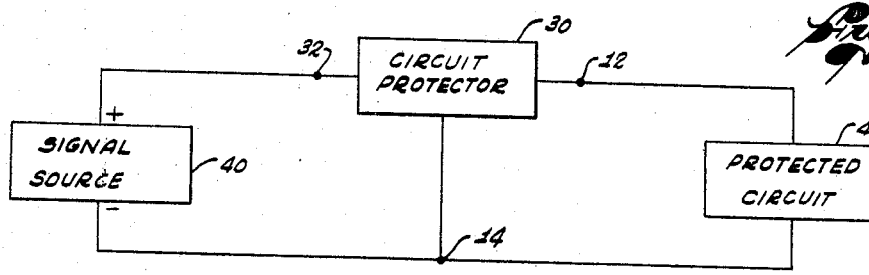
FIGURE 15 is a block diagram of an electrical circuit illustrating the circuit connection of the automatically resettable over-voltage circuit protector.

Typical circuit connections for the basic over-voltage circuit protector 10 as well as the automatically resettable circuit protector 30 are illustrated in block diagram form in FIGURES 13 and 15. In FIGURE 13, the circuit protector 10 is connected in parallel with a D-C signal source 36 across a protected circuit 38 and functions as previously described to protect the protected circuit 38. In FIGURE 15, the circuit protector 30 has its terminals 32 connected to the positive side of a D-C source 40, the terminal 12 connected to one of the input terminals of a protected circuit 42, and its terminal 14 in common with the negative terminal of the source and the remaining input to the protected circuit.

Figure 2:
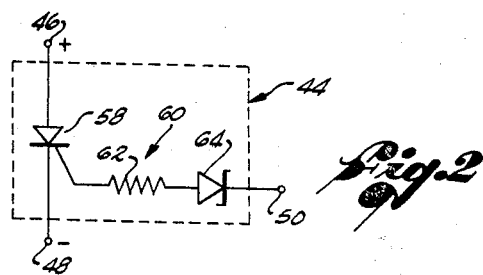
FIGURE 2 is a schematic of a circuit protector including a remote lead for sensing over-voltages.

A slightly modified form of circuit protector for over-voltage conditions is represented by the numeral 44 in FIGURE 2. The circuit protector 44 possesses a capability of sensing over-voltages across circuitry other than a D-C source connected directly to the circuit protector. To accomplish this, the circuit protector 44 includes three terminals 46, 48 and 50. The terminal 46 is adapted for connection to the positive side of a D-C source. The terminal 48 is adapted for connection to the negative side of the D-C source and also to one of the input terminals of the circuitry being protected. The terminal 50, on the other hand, may be connected to the other input of the protected circuit with other circuitry, such as a voltage regulator, current limiter or like, connected between the terminals 46 and 50.

Figure 14:
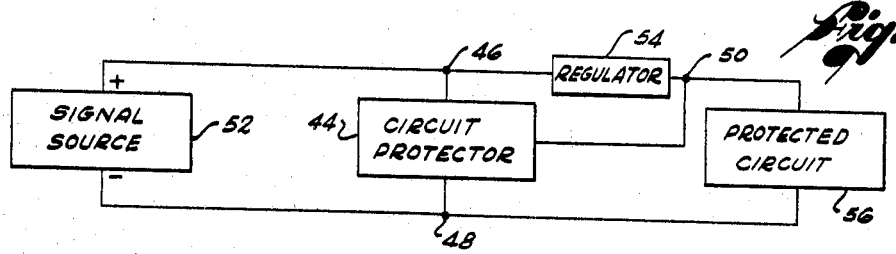
FIGURE 14 is a block diagram of an electrical circuit illustrating the circuit connection of the over-voltage circuit protector including a remote sensing lead.

Such an arrangement is illustrated in FIGURE 14 wherein the terminal 46 is connected to the positive side of a D-C signal source 52 and to the input to a voltage regulator 54, the terminal 48 to the negative side of the D-C source 52 and to one of the inputs to a protected circuit 56, and the terminal 50 to the output of the voltage regulator 54 and to the other input terminal of the protected circuit 56.

The internal circuit configuration of the protector 44 is very similar to the basic over-voltage circuit 10 previously described in connection with FIGURE 1 and includes a silicon controlled rectifier 58 having its anode connected to the terminal 46 and its cathode to the terminal 48. The control electrode of the silicon controlled rectifier 58 is connected to a series circuit 60 including a resistor 62 and a Zener diode 64 having its cathode connected to the terminal 50.

As with the protector 10, the triggering line voltage for switching the silicon controlled rectifier 58 to its conductive state is controlled by the value of the resistor 62 and the threshold voltage of the Zener diode 64. In fact, the triggering line voltage for the protector circuit 44 is equal to the threshold voltage of the Zener diode 64, the voltage drop across the resistor 62 and the gate voltage of the silicon controlled rectifier 58.

With this in mind, consider for the moment the circuit connection illustrated in FIGURE 14. Whe an over-voltage exceeding the predetermined triggering line voltage appears between the terminals 50 and 48, the Zener diode 64 rapidly switches to its conductive state allowing current to flow through the resistor 62 and the control electrode-cathode circuit of the silicon controlled rectifier 58. This causes the silicon controlled rectifier to immediately switch to its conductive state to short-circuit the voltage regulator 54 and protected circuit 56, thereby protecting the circuit 56 from the damaging effects of the over-voltage.

In practice, the over-voltage protection circuit 44 has proven itself to the same advantages and characteristics as the basic over-voltage protection circuit 10 previously described. For example, the protector circuit 44 has a very short response time to an over-voltage condition, being on the order of 500 nano-seconds, is simple in design, inexpensive to manufacture, rugged and long-lasting in construction, and efficient and reliable in operation over a temperature range of from $-50°$ C. to above $100°$ C.

Figure 4:
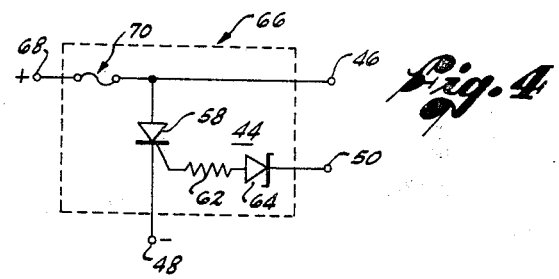
FIGURE 4 is a schematic of an automatically resettable circuit protector having a remote lead for sensing over-voltages.

However to de-energize or reset the protection circuit 44 to its normally nonconductive condition, it is necessary to manually open the circuit to the D-C source, allowing the anode voltage to drop and reset the silicon control rectifier 58. A protector circuit embodying advantages of the circuit protector 44 and in addition possessing an automatically resettable feature is represented by the numeral 66 in FIGURE 4.

Figure 3:
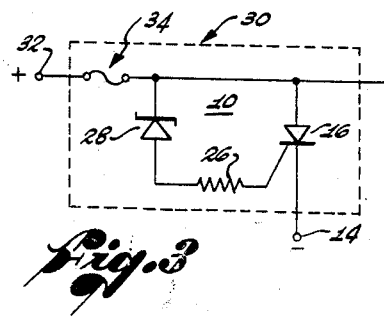
FIGURE 3 is a schematic of an automatically resettable circuit protector for sensing over-voltages.

As illustrated, the protector circuit 66 actually includes the portector 44. In the circuit protector 66, however, the terminal 46 functions as an output terminal for the protector circuit which includes additional input terminal 68 for connection to the positive terminal of a direct current source. In addition, an automatically resettable switch 70, similar to the switch 34 of FIGURE 3, is connected to the input terminal 68 and to the anode of the silicon control rectifier 68 in series with the output terminal 46.

Figure 16:
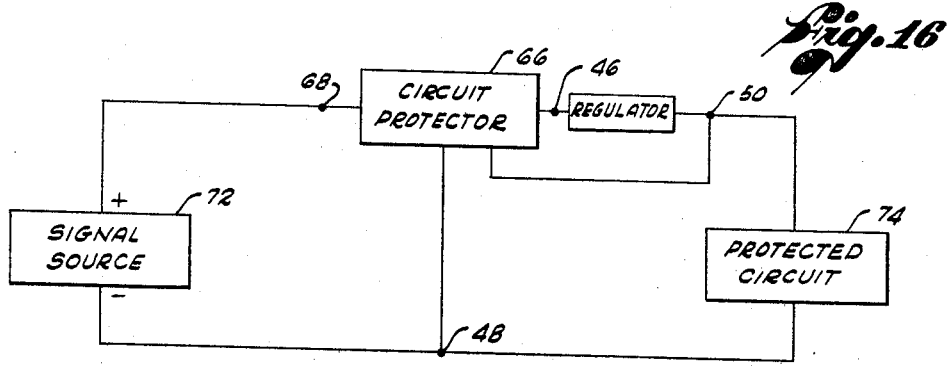
FIGURE 16 is a block diagram of an electrical circuit illustrating the circuit connection of the automatically resettable over-voltage protector including a remote sensing lead.

A typical circuit connection for the circuit protector 66 is as illustrated in FIGURE 16 wherein the terminal 68 is connected to the positive terminal of the D-C source 72, the terminal 48 to the negative terminal of the source and to one of the input terminals of the protector circuit 74, and the terminals 46 and 50 connected to the input and output respectively, of a voltage regulator 76.

The operation of the protector 44 within the circuit protector 66 is the same as previously described in connection with FIGURE 2. However, when the silicon control rectifier 58 fires to short-circuit the protector circuit 74, a high current flows through the silicon control rectifier and the resettable switch means 70. The switch means 70 is selected such that the high current causes the switch means to open, thereby opening the circuit from the signal source 72. When this occurs, the anode voltage of the silicon control rectifier 58 drops and the rectifier automatically returns to its normally nonconductive state. After a predetermined period of time, the switch means 70 automatically resets or closes, again connecting the signal source 72 to the circuit protector 66 which is now ready for another operation in response to an over-voltage condition.

In addition to the over-voltage protection, it is also often desired to protect against over-currents. A basic circuit for protecting against an over-current and having all the attributes of the over-voltage circuit protector 10 is represented by the numeral 78 in FIGURE 5. As illustrated, the protector 78 includes three terminals, 80, 82 and 84. The terminal 80 is adapted for connection to the positive side of a D-C source and to one of the input terminals of the circuit being protected. The terminal 82 is adapted for connection to the negative side of the D-C source, while the terminal 84 is adapted for connection to the other input terminal to the protected circuit. Internally, protector circuit 78 includes a silicon control rectifier 86 having its anode 88 connected to the terminal 80, its cathode 90 conected to the terminal 82 and its control or gate electrode 92 connected to a series circuit 94. The series circuit 94 includes a resistor 96 and a Zener diode 98 here having its cathode connected to the terminal 84. Extending between the cathode of the Zener diode 98 and the cathode of the silicon control rectifier 86 in series with the terminals 82 and 84 is a variable resistor 100.

Thus connected, the circuit protector 78 is designed to operate only when the anode voltage of the silicon controlled rectifier 86 is positive and the current flowing through the resistor 100 equals or exceeds a predetermined minimum value hereinafter referred to as the triggering line current.

The triggering line current may be defined as the minimum line current which will develop the triggering line voltage across the resistor 100 and hence between the cathodes of the Zener diode 98 and the rectifier 86. As in the over-voltage circuit protectors previously described, the triggering line voltage is determined by the value of the resistor 96 and the threshold voltage of the Zener diode 98. Having once selected these components, the adjustment or selection of the value of the resistor 100 then determines the value of the triggering line current for the protector 78.

Accordingly, the operation of the circuit protector 78 is very similar to that of the basic over-voltage protector 10. In particular, when an over-current equal to or exceeding the triggering line current flows through the resistor 100, a voltage is developed thereacross which equals or exceeds the triggering line voltage for the protector circuit 78. The Zener diode 98 then immediately switches to its conductive state, and current flows through the resistor 96 and control electrode-cathode circuit of the silicon controlled rectifier 86, causing the rectifier to switch to its conductive state. When this occurs, the circuitry being protected is effectively short-circuited and substantially all current flows through the conductive silicon controlled rectifier 86. This condition continues so long as the anode voltage of the rectifier 86 is positive relative to the cathode 90. Therefore, as in the basic over-voltage protection circuit 10, it is necessary to open the circuit between the D-C source and the protector 78 to reset the protector circuit.

Figure 7:
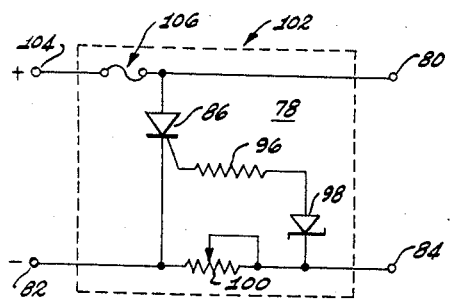
FIGURE 7 is a schematic of an automatically resettable circuit protector for sensing and operating upon over-current conditions.

An automatically resettable, over-current, circuit protector embodying the features and advantages of the protector 78 is represented by the numeral 102 in FIGURE 7. More particularly, the circuit protector 102 includes the protector 78, the terminal 80 here being adapted for connection to one of the inputs of the circuitry being protected. The circuit protector 102 also includes an input terminal 104 for connection to the positive terminal of a D-C source and an automatically resettable switch 106, similar to the switch 34 previously described, connected to the input terminal 104 and to the anode of the silicon controlled rectifier 86 in series with the terminal 80.

Within the circuit protector 102, the protector 78 operates in the same manner as previously described in connection with FIGURE 5. Thus, when a current equal to or exceeding the triggering line current flows through the resistor 100, the silicon controlled rectifier 86 immediately switches to its conductive condition, effectively short-circuiting the circuitry being protected. When this occurs, substantially all of the current from the D-C source flows through the anode-cathode circuit of the silicon controlled rectifier 86 and the switch 106. The switch 106 is selected such that when this occurs, the short-circuit current flow causes the switch to open, thereby disconnecting the D-C source from the protected circuit. At the same time, the anode voltage of the silicon controlled rectifier 86 drops, causing the rectifier to automatically return to its nonconductive state. After a predetermined period of time, the switch 106 automatically resets or recloses to again connect the protector 102 to the D-C source. If the over-current condition persists, the foregoing operation is repeated until the over-current condition is corrected.

Figure 5:
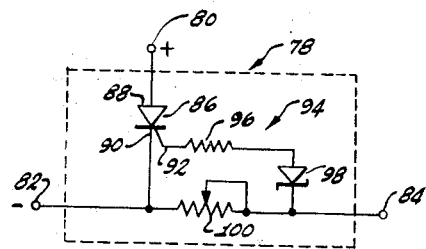
FIGURE 5 is a schematic of a basic form of protector circuit for protecting against over-currents.
Figure 6:
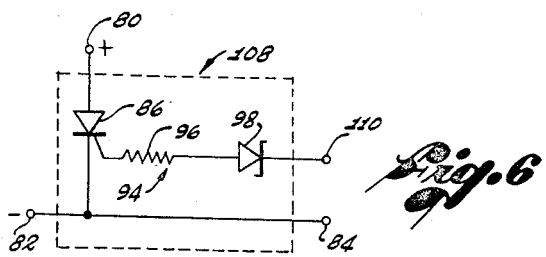
FIGURE 6 is a schematic of a circuit protector having a remote lead for sensing over-currents.

A slightly modified form of the basic over-current protector is illustrated in FIGURE 6 and represented generally by the numeral 108. The circuit protector 108 is the same as the circuit protector 78 illustrated in FIGURE 5 (corresponding reference numerals being utilized in FIGURES 5 and 6 to represent like elements), except that the resistor 100 is not included within the internal circuitry of the protector 108. Rather, the protector 108 is designed such that the terminal 84 and a terminal 110 connected to the cathode of the Zener diode 98 are adapted for connection across a resistor external to the circuit protector. This allows the circuit protector to sense and operate upon a different current than that directly supplied from the direct current source connected to the terminals 80 and 82. For example, the terminals 80 and 82 may be connected across a D-C source and the input terminals to a circuit being protected while the terminals 84 and 110 are connected to a resistor sensing the output current in the load circuit of the circuitry being protected. Other than this, the circuit connection and operation of the circuit protector 108 is the same as that previously described in connection with the circuit protector 78, and will not be here repeated.

An automatically resettable over-current protection circuit embodying the features of the circuit protector 108 is illustrated in FIGURE 8 and represented generally by the numeral 112. In fact, a circuit protector 112 includes the circuit protector 108 with the terminal 80 adapted for connection to one of the input terminals of the circuitry being protected. In addition, a circuit protector 112 includes an input terminal 114 for connection to the positive terminal of a D-C source and an automatically resettable switch 116 similar to the switch 34 previously described in connection with FIGURE 3. The switch 116 is connected to the terminal 114 and the anode of the silicon controlled rectifier 86 in series with the terminal 80.

Within the circuit protector 112, the operation of the protector 108 is the same as that previously indicated in connection with FIGURE 6. Thus, when an over-current flows through the external resistor connected between the terminals 110 and 84, the silicon controlled rectifier 86 switches to its conductive state, short-circuiting the protected circuitry. When this occurs, substantially all of the current from the D-C source flows through the silicon controlled rectifier 86 and the switch 116. The switch 116 is selected to open in response to such short-circuit current, thereby disconnecting the source from the protected circuitry. This also causes the anode voltage of the silicon controlled rectifier 86 to drop, allowing the rectifier to return or reset to its normally nonconductive state. After a predetermined period of time, the switch 116 automatically resets or closes, again connecting the source to the protector circuit 112, readying the protector circuit for operation on other over-currents. If the over-current which caused the original operation of the protective circuit 112 is still present, the foregoing operation is repeated periodically until the over-current condition is corrected.

The over-current protection circuits described in connection with FIGURES 5, 6, 7 and 8 each utilize a resistor to sense an over-current condition. In some circuits, however, power dissipation is a serious problem. In such instances, the continuous flow of current through the sensing resistors, such as 100, may result in an undesired power loss.

An over-current protection circuit having a minimum power loss, as well as the other advantages of the previously described over-current protectors, is illustrated in FIGURE 9 and represented generally by the numeral 118. Basically, the circuit protector 118 utilizes a magnetic sensing method, rather than the resistor sensing method, the develop a low voltage proportional to the current being sensed. The circuit protector 118 is designed to operate upon the low voltage to trigger a silicon controlled rectifier when a predetermined line current valve is exceeded. In addition, the circuit protector 118 is automatically resettable.

More particularly, the circuit protector 118 includes a standard magnetic amplifier 120 including a saturable core reactor 122 and a filter rectifier 124. As illustrated, the input terminals 125 and 127 of the filter rectifier 124 are connected across a reference A-C source 126 through the series connected secondary windings of the saturable reactor 122. The output terminals 129 and 131 of the filter rectifier 124 are connected across a variable resistor 126. The series connected primary windings of the saturable reactor 122 are connected to the output terminal 129 and in series between a terminal 128 (adapted for connection to one of the inputs to the circuit being protected) and the terminal 130 (adapted for connection to the negative terminal of a D-C source).

In addition to the magnetic amplifier 120, the circuit protector 118 includes an input terminal 132 for connection to the positive terminal of the D-C source, a terminal 134 for connection to the other input to the circuit being protected and an over-current protection circuit 135.

The protection circuit 135 is very similar to the protector 78 of FIGURE 5 and includes the variable resistor 126, a silicon controlled rectifier 136 and a series circuit 138. The anode of the rectifier is connected to the terminal 134 and the cathode to the terminal 130. The control or gate electrode of the rectifier is connected to the series circuit 138 including a resistor 140 and a Zener diode 142 having its cathode connected to the resistor 126, as illustrated.

To complete the circuit protector 118, a resettable switch means 144 similar to the switch means 34 previously described is connected between the terminal 132 and the anode of the silicon controlled rectifier 136 in series with the terminal 134.

The operation of the circuit protector 118 is very similar to that of the circuit protector 102 of FIGURE 7 with one major exception. The current being sensed does not flow directly through the resistor 126 to trigger the protector 135. Rather, the current being sensed flows through the primary windings of the magnetic amplifier 120 which in turn develops a relatively low current through and voltage across the resistor 126 in a manner well known in the art. Accordingly, even though the sensed current may be of a relatively high value, the power lost in the protection circuit is at a minimum.

Further, the actual triggering line current for the protection circuit 118 may be preset in substantially the same manner as described in connection with FIGURE 6. In particular, the selection of the Zener diode 142 and the resistor 140 determines the triggering line voltage for the rectifier 136. The value of the resistor 126 then determines the current value necessary to produce the triggering line voltage, and the D-C current conversion characteristics of the magnetic amplifier 120 determines the value of line current which will produce such current flow through the resistor 126, thereby fixing the value of the triggering line current.

When a current equal to or exceeding the triggering line current actually flows through the primary winding of the magnetic amplifier 120, the silicon controlled rectifier 136 switches to its conductive state in the same manner as the silicon controlled rectifier 86 previously described in connection with FIGURE 5, short-circuiting the circuitry being protected. The current from the signal source then flows through the silicon controlled rectifier 136 and the switch 144, causing the switch to open. This produces an immediate drop in the anode voltage of the silicon controlled rectifier, causing it to reset to its normally nonconductive state. After a predetermined period of time, the switch 144 automatically recloses, again connecting the circuit protector 118 to the source, readying the circuit protector for another operation in response to an over-current condition.

FIGURES 10 and 11 illustrate circuit protectors for over-voltage and over-current conditions, respectively, and are arranged to operate in response to alternating current signals.

The circuit protector of FIGURE 10 is represented generally by the numeral 146 and basically includes a pair of the circuit protector 10 previously described in connection with FIGURE 1. In FIGURE 10, such circuit protectors are presented by the numeral 10' and 10", and corresponding numbers with prime (') and double prime (") notations are utilized to represent like circuit elements. In this respect, it should be noted, however, that the protectors 10" and 10' are connected in parallel between a pair of terminals 148 and 150, with the silicon controlled rectifiers 16' and 16" poled in opposite directions.

In addition to the circuit protectors 10' and 10", the protector circuit 146 includes a pair of input terminals 152 and 154 for connection across an A-C source, and an automatically resettable switch means 156 connected between the terminals 152 and 148 in series with both the silicon controlled rectifiers 16' and 16". The resettable switch 156 is similar to the resettable switch 134 previously described in connection with FIGURE 3.

In the circuit configuration of FIGURE 10, the protectors 10' and 10" operate in the same manner as previously described in connection with FIGURE 1, but on different half cycles of the alternating current input signal. In particular, when the anode of the silicon controlled rectifier 16' is positive relative to its cathode and the protector circuit 10' will trigger in response to a voltage equal to or exceeding the triggering line voltage of the protector 10' as determined by the Zener diode 28' and resistor 26'. In a similar manner, when the anode of the silicon controlled rectifier 16" is positive relative to its cathode, the protector circuit 10" will trigger in response to a voltage equal to or exceeding the triggering line voltage of the protector circuit 10" as determined by the Zener diode 28" and resistor 26".

When either of the protector circuits 10' or 10" fires, the protected circuitry connected to the terminals 148 and 150 is effectively short-circuited and current from the alternating current source flows through the conducting silicon controlled rectifier and the resettable switch 156. The resettable switch 156 is selected such that it opens in response to the short-circuit current, thereby disconnecting the alternating current source from the protected circuitry. At the same time, the anode voltage of the conducting silicon controlled rectifier drops, causing the silicon controlled rectifier to be returned to its normally nonconductive state. After a predetermined period of time, the switch 156 automatically recloses connecting the protector circuit 146 between the alternating current source and the protected circuitry. The protector circuit 146 is then ready to again operate in response to an over-voltage condition on either of the half cycles of the alternating signal developed by the source.

The A-C over-current protector illustrated in FIGURE 11 is represented generally by the numeral 158, and includes a pair of basic over-current protectors 78 previously described in connection with FIGURE 5. Accordingly, in FIGURE 11 the over-current protectors are represented by the numerals 78' and 78" and corresponding numbers with prime (') and double prime (") notations are utilized to represent like circuit elements. In this respect, it should be noted, however, that the over-current protectors 78' and 78" are connected in parallel between terminals 160 and 162, and are inverted relative to each other.

In addition to the over-current protectors 78' and 78", the circuit protector 158 includes a pair of input terminals 164 and 166 for connection to an A-C source and automatically resettable switch means 168, similar to 34 in FIGURE 3, connected to the terminal 164 in series with the silicon controlled rectifiers 86' and 86".

The over-current protectors 78' and 78" function exactly as previously described for the over-current protector 78 in connection with FIGURE 5, except that they function on different half cycles of the alternating current signal applied thereto. More particularly, when the terminal 164 is positive relative to the terminal 166, the anode of the silicon controlled rectifier 86' is positive relative to its cathode. Under such conditions, if a current transient occurs in the circuit through the resistor 100' which exceeds the triggering line current of the protector 78', as determined by the resistor 100', Zener diode 98' and resistor 96', the rectifier 86' switches to its conductive state short-circuiting the protected circuitry. A similar operation occurs in the over-current protector 78" when the terminal 166 is positive relative to the terminal 164, and a current transient equals or exceeds the triggering line current of the protector 78" as determined by the resistor 100", the Zener diode 98", and the resistor 96".

When either of the protectors 78' or 78" switch to a conductive state, the current from the A-C source flows through the conducting silicon controlled rectifier and the switch 168. The switch 168 is selected to open in response to such a short-circuit current, thereby disconnecting the source from the protected circuit. At the same time, this allows the anode voltage of the conducting rectifier to drop, thereby causing the rectifier to return to its normally nonconductive state. After a predetermined period of time, the switch 168 automatically recloses to again connect the over-current protection circuit 158 between the A-C source and the protected circuitry. If the over-current condition persists, the foregoing operation is repeated until the condition is corrected.

In practice, the over-voltage and over-current circuits illustrated in FIGURES 10 and 11 have proven to possess the advantages, operating characteristics and features previously attributed to the over-voltage and over-current circuits of FIGURES 1 and 5. Also, the addition of the switches 156 and 168 renders the protection circuits automatically resettable.

A different form of A-C protector is represented generally by the numeral 170 in FIGURE 12. The protector 170 possesses all the advantages of the previously described A-C protectors, yet differs therefrom in that it is capable of sensing and responding to A-C signals derived from the A-C source connected to the protected circuitry, such as the output voltage or current of the protected circuit.

To this end, the protector 170 includes a pair of input terminals 172 and 174 for connection across an A-C source, a pair of output terminals 176 and 178 for connection to the input terminals of the circuit being protected, and a pair of input terminals 180 and 182 for receiving the sensed A-C signal. In addition, the protector 170 includes a pair of over-voltage protection circuits 183 and 185, a transformer 202 having its primary 204 connected to the terminals 180 and 182, and including a pair of secondary windings 200 and 206, and an automatically resettable switch 224, similar to 34 of FIGURE 3, connected between the terminals 172 and 176 in series with the circuits 183 and 185.

The circuits 183 and 185 are similar to the over-voltage protectors 44 of FIGURE 2 only inverted relative to each other, and the sensed voltages are developed across the secondary windings 200 and 206 of the transformer 202. More particularly, the circuit 183 includes a silicon controlled rectifier 184 having an anode 186 connected to the output terminal 176, a cathode 188 connected in common to the input terminal 174 and output terminal 178, and a control electrode 190 connected to a series circuit 194 including a resistor 196 and a Zener diode 198. A diode 192 is connected between the control electrode 190 and the cathode 188, with its anode connected to the cathode 188 and the secondary winding 200 of the transformer 202 is connected between the Zener diode 198 and the cathode of the silicon controlled rectifier 186 to complete the protector 183.

Similarly, the circuit 185 includes a silicon controlled rectifier 208 having an anode 210 connected in common to the input terminal 174 and output terminal 178, a cathode 212 connected to the output terminal 176, and a control electrode 214 to a series circuit 218 including a resistor 220 and a Zener diode 222. A diode 216 is connected between the control electrode 214 and the cathode 212 with the anode of the diode being connected to the cathode 212 and the secondary winding 206 of the transformer 202 is connected between the Zener diode 222 and the cathode of the silicon controlled rectifier 208 to complete the protector 185.

Thus arranged, the silicon controlled rectifiers 184 and 208 are connected to operate during different half cycles of the A-C signal developed across the input terminals 172 and 174. In particular, when the input terminal 172 is positive relative to the input terminal 174, the anode 186 of the rectifier 184 is positive relative to the cahode 188. Under these conditions, the rectifier will trigger if a voltage equal to or exceeding the triggering line voltage determined by the Zener diode 198, the resistor 196, and the gate voltage of the rectifier is developed across the secondary winding 200.

In a similar manner, when the input terminal 174 is positive relative to the input terminal 172, the anode 210 of the silicon controlled rectifier 208 is positive relative to the cathode 212. Under these conditions, the rectifier will trigger if a voltage equal to or exceeding the triggering line voltage is developed across secondary winding 206.

The actual firing of the silicon controlled rectifiers 184 and 208, however, is under the control of the A-C signal applied to the terminals 180 and 182. Thus, assuming that the input terminal 172 is positive relative to the input terminal 174, thereby priming the rectifier 184, when the terminal 180 is positive relative to the terminal 182, a voltage having a polarity indicated by the dot notation is developed across the secondary winding 200. If the voltage developed across the secondary winding 200 exceeds the triggering line voltage of the protection circuit 183, the rectifier 184 triggers in the manner previously described in connection with FIGURE 1, effectively short-circuiting the protected circuitry which is connected between the terminals 176 and 178.

During the same half cycle of the A-C control signal, the voltage developed across the secondary winding 206 has a polarity indicated by the dot notation, causing a current to flow in the loop defined by the diode 216, series circuit 218 and secondary winding 206, thereby bypassing the rectifier 208.

Next, assuming that the input terminal 174 is positive relative to the input terminal 172 to prime the silicon controlled rectifier 208, when the terminal 182 is positive relative to the terminal 180, a positive voltage is developed at the cathode of the Zener diode 122. If the A-C sensed by the primary winding 204 and the transformer 202 includes a transient of sufficient magnitude to produce an over-voltage across the secondary winding 206, the silicon controlled rectifier 208 will trigger in the manner previously described, thereby effectively short-circuiting the protected circuitry. During the same half cycle, current flows in the series loop defined by the series circuit 194, the secondary winding 200, and the diode 192, bypassing the rectifier 184.

Whenever either the silicon controlled rectifiers 184 or 208 are conductive to short circuit the protected circuitry, current from the A-C source passes through the conductive rectifier and through the switch 224. The switch is selected to open in response to the short-circuit current, thereby disconnecting the source from the protected circuitry. Also, the opening of the switch 124 allows the anode voltage of the conducting silicon control rectifier to drop, causing the silicon control rectifier to return to its normal nonconductive state. After a predetermined period of time, the switch 224 automatically recloses, again connecting the protection circuit 170 between the A-C source and the circuit being protected, ready for reoperation in response to undesired transients.

In view of the foregoing, it should be appreciated that the present invention provides protection devices for both A-C and D-C over-currents and voltages which are simple in design, inexpensive to manufacture, and which will operate upon transients of less than one microsecond duration. Further, the protection devices are extremely compact, rugged, and durable in construction, as well as long-lasting and reliable in operation. Also, certain embodiments of the protection device are automatically resettable.

In the foregoing, specific forms of the present invention have been described in detail. Modifications, however, may occur to those skilled in the art without departing from the spirit of the present invention.

We claim:

1. A protector for electrical circuitry comprising:
   a normally nonconducting silicon controlled rectifier having an anode, a cathode, and a control electrode;
   a series circuit including a resistor and a normally nonconductive element having a predetermined voltage threshold of conduction connected in series with said control electrode;
   and electrical control means connected in series with said silicon controlled rectifier, said control means enabling said silicon controlled rectifier to return to its normally noconducting state following a state of conduction, and enabling re-establishment of said electrical circuitry to the substantially normal state of said electrical circuitry prior to said state of conduction of said silicon controlled rectifier.

2. A protector for electrical circuitry comprising:
   a silicon controlled rectifier having an anode, a cathode, and a control electrode;
   a series circuit connected between said control electrode and said anode including a resistor and a normally nonconductive element having a predetermined voltage threshold of conduction;
   and electrical switch means connected in series with said silicon controlled rectifier, said switch means having the characteristic of being normally closed, opening upon the conduction of said silicon controlled rectifier and automatically re-closing after a predetermined period of time.

3. An over-voltage protection device for electrical circuitry comprising:
first and second terminals for connection to the input terminals of the circuit being protected;
a silicon controlled rectifier having an anode connected to said first terminal, a cathode connected to said second terminal, and a control electrode;
a series circuit between said control electrode and said anode including a resistor and a normally non-conductive Zener diode;
and electrical switch means connected in series with said silicon controlled rectifier, said switch means having the characteristic of being normally closed, opening upon the conduction of said silicon controlled rectifier and automatically reclosing after a predetermined period of time.

4. An over-voltage protection device for electrical circuitry comprising:
first and second terminals for connection across the input of the circuit being protected, and a third terminal for connection to a different point in the circuitry being protected;
a silicon controlled rectifier having an anode connected to said first terminal, a cathode connected to said second terminal, and a control electrode;
a series circuit between said control electrode and said third terminal including a resistor and a normally non-conductive Zener diode;
and electrical switch means connected in series with said silicon controlled rectifier, said switch means having the characteristic of being normally closed, opening upon the conduction of said silicon controlled rectifier and automatically re-closing after a predetermined period of time.

5. An over-current protection device for electrical circuitry comprising:
a magnetic amplifier for developing a D-C voltage proportional to the value of a direct current applied thereto and including an A-C input for connection to a reference A-C source, a D-C input lead for receiving said D-C current and first and second output terminals, said first output terminal being connected to said D-C input lead;
a first resistor connected between said first and second output terminals of said magnetic amplifier;
a silicon controlled rectifier for connection across the circuit being protected and including an anode, a cathode connected to said second output terminal of said magnetic amplifier, and a control electrode;
and a series circuit between said first output terminal of said magnetic amplifier and said control electrode including a second resistor and a normally nonconductive element having a predetermined voltage threshold of conduction.

6. An over-current protection device for electrical circuitry comprising:
a magnetic amplifier for developing a D-C voltage proportional to the value of a direct current applied thereto and including an A-C input for connection to a reference A-C source, a D-C input lead for receiving said D-C current and first and second output terminals, said first output terminal being connected to said D-C input lead;
a first resistor connected between said first and second output terminals of said magnetic amplifier;
a silicon controlled rectifier for connection across the circuit being protected and including an anode, a cathode connected to said second output terminal of said magnetic amplifier, and a control electrode;
a series circuit between said first output terminal of said magnetic amplifier and said control electrode including a second resistor and a normally nonconductive element having a predetermined voltage threshold of conduction;
and electrical switch means connected in series with said silicon controlled rectifier, said switch means having the characteristic of being normally closed, opening upon the conduction of said silicon controlled rectifier and automatically re-closing after a predetermined period of time.

7. A protector for electrical circuitry comprising:
first and second terminals;
a first silicon controlled rectifier having an anode connected to said first terminal, a cathode connected to said second terminal, and a control electrode;
a first series circuit between said control electrode and said anode of said first silicon controlled rectifier including a first resistor and a first normally nonconductive element having a predetermined voltage threshold of conduction;
a second silicon controlled rectifier having an anode connected to said second terminal, a cathode connected to said first terminal, and a control electrode;
a second series circuit between said control electrode and anode of said second silicon controlled rectifier including a second resistor and a second normally nonconductive element having a predetermined voltage threshold of conduction;
and electrical switch means connected to said first terminal in series with both said first and second silicon controlled rectifiers, said switch means having the characteristic of being normally closed, opening upon a conduction of either of said first or second silicon controlled rectifiers and automatically reclosing after a predetermined period of time.

8. A protector for electrical circuitry comprising:
first and second input terminals for connection to an alternating current signal source;
first and second output terminals for connection to the input terminals of the circuitry being protected;
a first silicon controlled rectifier having an anode connected to said first input terminal, a cathode connected to said second input terminal, and a control electrode;
a first series circuit connected to said control electrode of said first silicon controlled rectifier and said second input terminal including a first resistor and a first normally nonconductive element having a predetermined voltage threshold of conduction;
a second resistor connected between said cathode of said first silicon controlled rectifier and said second output terminal;
a second silicon controlled rectifier having an anode connected to said second input terminal, a cathode connected to said first input terminal, and a control electrode;
a second series circuit connected to said control electrode of said second silicon controlled rectifier and said first input terminal including a third resistor and a second normally nonconductive element having a predetermined voltage threshold of conduction;
and a fourth resistor connected between said cathode of said second silicon controlled rectifier and said first output terminal.

9. A protector for electrical circuitry comprising:
first and second input terminals for connection to an alternating current signal source;
first and second output terminals for connection to the input terminals of the circuitry being protected;
a first silicon controlled rectifier having an anode connected to said first input terminal, a cathode connected to said second input terminal, and a control electrode;
a first series circuit connected to said control electrode of said first silicon controlled rectifier and said second input terminal including a first resistor and a first normally nonconductive element having a predetermined voltage threshold of conduction;
a second resistor connected between said cathode of said first silicon controlled rectifier and said second output terminal;

a second silicon controlled rectifier having an anode connected to said second input terminal, a cathode connected to said first input terminal, and a control electrode;

a second series circuit connected to said control electrode of said second silicon controlled rectifier and said first input terminal including a third resistor and a second normally nonconductive element having a predetermined voltage threshold of conduction;

a fourth resistor connected between said cathode of said second silicon controlled rectifier and said first output terminal;

and electrical switch means connected to said first input terminal in series with both said first and second silicon control rectifiers, said switch means having the characteristic of being normally closed, opening upon a conduction of either of said first or second silicon controlled rectifiers and automatically reclosing after a predetermined period of time.

10. A protector for electrical circuitry comprising:
first and second terminals for connection to an A-C source and to the circuit being protected;
third and fourth input terminals for receiving an A-C signal;
a transformer including a primary winding connected across said third and fourth terminals, and first and second secondary winding;
a first silicon controlled rectifier having an anode connected to said first terminal, a cathode connected to said second terminal, and a control electrode;
a first unidirectional conductive device connected between said control electrode and cathode of said first silicon controlled rectifier;
a first series circuit between said control electrode of said first silicon controlled rectifier and one end of said first secondary winding, the other end of said first secondary winding being connected to said second terminal, said first series circuit including a first resistor and a first normally nonconductive element having a predetermined voltage threshold of conduction;
a second silicon controlled rectifier including an anode connected to said second terminal, a cathode connected to said first terminal, and a control electrode;
a second unidirectional conductive device connected between said control electrode and cathode of said second silicon controlled rectifier;
and a second series circuit connected between said control electrode of said second silicon controlled rectifier and one end of said second primary winding, the other end of said second primary winding being connected to said first terminal, said second series circuit including a second resistor and a second normally nonconductive element having a predetermined voltage threshold of conduction.

11. A protector for electrical circuitry comprising:
first and second terminals for connection to an A-C source and to the circuit being protected;
third and fourth input terminals for receiving an A-C signal;
a transformer including a primary winding connected across said third and fourth terminals, and first and second secondary winding;
a first silicon controlled rectifier having an anode connected to said first terminal, a cathode connected to said second terminal, and a control electrode;
a first unidirectional conductive device connected between said control electrode and cathode of said first silicon controlled rectifier;
a first series circuit between said control electrode of said first silicon controlled rectifier and one end of said first secondary winding, the other end of said first secondary winding being connected to said second terminal, said first series circuit including a first resistor and a first normally nonconductive element having a predetermined voltage threshold of conduction;
a second silicon controlled rectifier including an anode connected to said second terminal, a cathode connected to said first terminal, and a control electrode;
a second unidirectional conductive device connected between said control electrode and cathode of said second silicon controlled rectifier;
a second series circuit connected between said control electrode of said second silicon controlled rectifier and one end of said second primary winding, the other end of said second primary winding being connected to said first terminal, said second series circuit including a second resistor and a second normally nonconductive element having a predetermined voltage threshold of conduction;
and electrical switch means connected to said first terminal in series with both said first and second silicon controlled rectifiers, said switch means having the characteristic of being normally closed, opening upon a conduction of either of said first or second silicon controlled rectifiers, and automatically reclosing after a predetermined period of time.

References Cited

UNITED STATES PATENTS

| | | | |
|---|---|---|---|
| 2,774,929 | 12/1956 | Schaefer | 317—13 X |
| 3,018,356 | 1/1962 | Busch et al. | 317—33 X |
| 3,213,349 | 10/1965 | Gutzwiller | 317—33 |
| 3,317,792 | 5/1967 | Sutherland | 317—33 X |
| 2,925,548 | 2/1960 | Scherer | 317—33 X |
| 3,215,896 | 11/1965 | Shattuck et al. | 317—16 |
| 3,295,020 | 12/1966 | Borkovitz | 317—33 |
| 3,303,388 | 2/1967 | Means | 317—33 |
| 3,310,777 | 3/1967 | Fosdick | 317—33 X |
| 3,325,718 | 6/1967 | McNulty | 317—33 X |
| 3,335,325 | 8/1967 | Elpers | 317—31 |

FOREIGN PATENTS

| | | |
|---|---|---|
| 681,392 | 9/1939 | Germany. |
| 1,300,021 | 6/1962 | France. |

JOHN F. COUCH, Primary Examiner

J. D. TRAMMELL, Assistant Examiner

U.S. Cl. X.R.

307—252; 317—22, 31, 33, 40